July 18, 1961 H. R. FESMIRE 2,992,669
SOCKET SET SCREW KNURLED TIP
Filed Aug. 18, 1958

Inventor:
Herbert R. Fesmire
by Howson & Howson
Attys.

United States Patent Office 2,992,669
Patented July 18, 1961

2,992,669
SOCKET SET SCREW KNURLED TIP
Herbert R. Fesmire, Newtown, Pa., assignor to Standard Pressed Steel Co., Jenkintown, Pa., a corporation of Pennsylvania
Filed Aug. 18, 1958, Ser. No. 755,491
2 Claims. (Cl. 151—70)

This invention relates to improvements in set screws, and more particularly in set screws of the "cup point" type.

A principal object of the invention is to improve the holding power of screws of this type and their resistance to loosening under vibration.

To these general ends the invention contemplates a set screw cup-point formation, having a greater work-penetrating potential under a given installation torque than the cup points of the prior art.

While applicable to plain cup points, the invention has an application of particular value to cup points of knurled type, such as shown, for example, in United States Patent No. 2,201,027, dated May 14, 1940.

The invention will be more readily understood by reference to the attached drawings, wherein.

Figure 4:
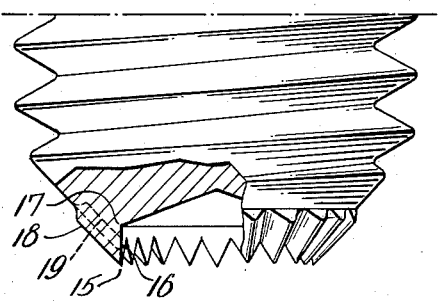
FIG. 4 is a side elevational view, partly in section, of the point end of a knurled cup-point set screw made in accordance with the present invention.
Figure 1:
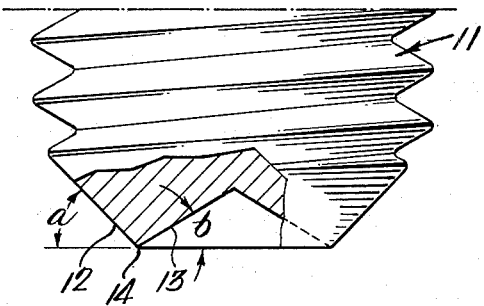
FIG. 1 is a side elevational view, partly in section, of the point or working end of a conventional cup-point set screw.

With reference to the drawings, FIG. 1 shows a conventional cup-point set screw. The screw, designated by the reference numeral 11, is designed to bite into the material of the "work" against which it may be tightened, to thereby resist the loosening effects of vibration, and to more securely anchor the screw to the work. This is a function of the cupped point, which, in effect, presents a wedge-like edge, between the outer and inner converging surfaces 12 and 13 of the point, to the surface of the work.

Contrary to the accepted view, a cupped point of this form has a definitely limited work-penetrating potential, both theoretical and actual. It is apparent that when a point of this character is pressed into the work, usually metal, penetration must be accompanied by displacement of the work material, and where the material is metal, the amount of material displaced will be substantially in definite ratio to the depth of penetration. Assuming that the angels (a) and (b) in FIG. 1 were equal, then the displacement would be in equal amount at both the faces 12 and 13. The material moving away from the circular edge 14 toward the outer face 12, however, will flow into a radially expanding area, whereas the material moving toward the inner face 13 will flow into a radially contracting area, and will therefore be subjected to a compressive stress. This stress, which increases in geometric progression as penetration advances, constitutes the major single factor limiting penetration of the point into the work.

Figure 2:
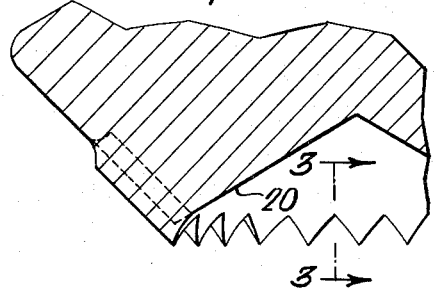
FIG. 2 is an enlarged fragmentary sectional view of the same screw, knurled in accordance with the principle disclosed in the aforesaid United States patent.

The same limiting factor is present in the conventional knurled cup-point screw shown in FIG. 2. In this case, penetration is somewhat improved, due to a slight reaming action of the knurls, but the metal displaced at the inner face of the point is still compacted necessarily in the radially contracting area of the cup. The increased holding power of a knurled screw of this type, over the holding power of a corresponding plain point screw of the character illustrated in FIG. 1, is due primarily to the inherent elasticity of the work material which tends to spring slightly into the spaces between the knurls, and to thereby mechanically interlock the screw point with the work.

Figure 5:
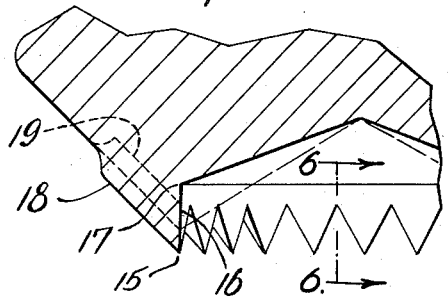
FIG. 5 is an enlarged fragmentary sectional view of the screw point shown in FIG. 4.
Figure 6:
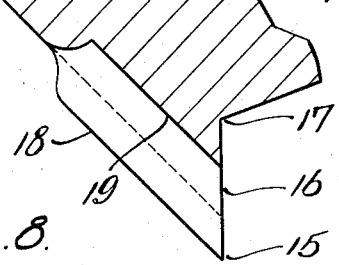
FIG. 6 is a sectional view on the line 6—6, FIG. 5.
Figure 3:
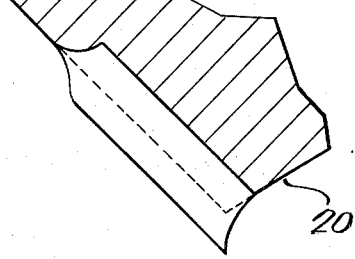
FIG. 3 is an enlarged sectional view on the line 3—3, FIG. 2.

I have discovered that if the cup of a knurled cup-point screw of the character illustrated in FIGS. 2 and 3 is counter-bored, so as to modify the cup surface in the manner illustrated in FIGS. 5 and 6, the point will have a substantially improved work-penetrating potential, together with a corresponding improvement in holding power and resistance to loosening under vibration. In the preferred form of counter-bore, the cupped recess extends axially from the extreme edge 15 of the point inwardly in cylindrical form, the side 16 of the cup being substantially parallel to the longitudinal axis of the screw and coaxial with the latter. Preferably, this cylindrical counter-bore will extend from the edge 15 to a point 17 beyond the roots of the knurls 18, the said roots being indicated by the reference numeral 19. The side of the cup thus formed is defined by the cylindrical surface 16, and the shape of the bottom of the cup may vary without affecting the functional aspects of the device.

The result of this counter-boring of the cup is best illustrated by comparison of FIG. 6 and FIG. 3. It will be apparent that the counter-bore has the effect of converting the inclined surface 20 of the conventional cup shown in FIG. 3 to the normal surface 16 of the counter-bored cup illustrated in FIG. 6. A cup point made in accordance with the invention, therefore, will entirely lack the aforesaid characteristic limitation of the conventional point which, as described, is a major limiting factor in the work-penetrating potential of the point. Thus, when the point of a screw made in accordance with the present invention is forced into the work, the resultant displacement of work metal is entirely toward the outer face of the point, the surface 16 of the cup being in direct alignment with the direction of point movement, and having no metal-displacing effect. The penetrating potential of the point is therefore materially greater than points of the character shown in FIG. 3. It will be noted further that the point of FIG. 6 comprehends an angle of not more than one-half of the angle comprehended by the inner and outer faces of the point shown in FIG. 3, thereby again materially increasing the capacity of the point to penetrate the work under a given installation torque.

Still further, the effective depth of the knurls at the entering edge of the point is materially increased by the cylindrical surface 16, over the depth of the knurls in the prior conventional form of point illustrated in FIG. 3. This increased knurl depth, coupled with the relatively small radial width of the knurl, not only has a materially greater reaming effect, but also affords relatively wide openings for escape, outwardly, of the metal of the work removed by the knurls, so that the knurls, in effect, are self-clearing, which again improves the penetrating potential of the point.

Figure 7:
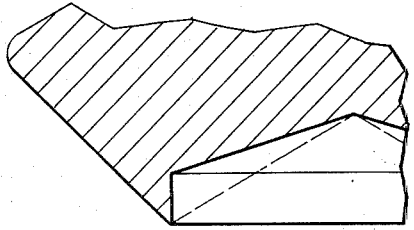
FIG. 7 is an elevational and partial sectional view, illustrating the principle of the invention as applied to a plain or unknurled cup-point set screw.

The invention is applicable in principle to plain cup points of the character shown in FIG. 1, and a plain cup point made in accordance with the invention is illustrated in FIG. 7.

Figure 8:
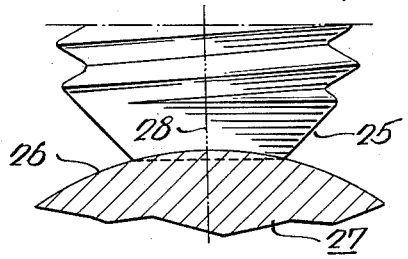
FIG. 8 is a diagrammatic elevational view showing the relationship between the point of a cup-point set screw and the peripheral surface of a cylindrical shaft or rod.
Figure 9:
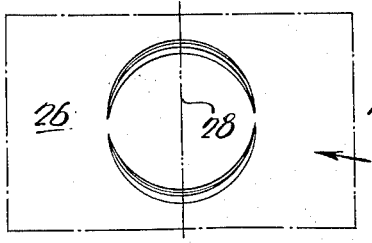
FIG. 9 is a fragmentary plan view of the said surface, showing the mark of the screw point on the surface.

An advantage of increased penetration under a given installation torque is illustrated in FIGS. 8 and 9. FIG. 8 shows the point 25 of a cup-point screw about to be impressed into the cylindrical surface 26 of a shaft or rod 27. As the point penetrates the cylindrcal surface, the major depth of penetration is along an axial line 28, shown in FIG. 9, this by reason of the curvature of the surface 26. In order to obtain a penetration of the complete circumference of the point of the screw, a relatively deep penetration is required at opposite sides of the line 28. This, with the conventional point, is frequently beyond the permissible installation torque. The increased penetration afforded by the present invention makes it possible with the same torque to obtain a complete peripheral penetration of the point of the screw in the work, with consequent materially increased holding power and resistance to loosening by vibration.

I claim:

1. A set screw comprising a cupped point, the wall of said point being in the form of an annular wedge whereof the outer surface defines generally the frustum of a cone and is knurled circumferentially forming a plurality of circumferentially spaced elongated tooth crests and roots extending from the inner edge of said frustum toward the outer edge thereof, and whereof the inner surface is approximately cylindrical in form, co-axial with the rotational axis of the screw, and intersects the said outer surface within the knurled area, said teeth terminating in said inner surface.

2. A set-screw according to claim 1, wherein the said inner surface extends inwardly to a point beyond the roots of the knurls.

References Cited in the file of this patent

UNITED STATES PATENTS

| | | |
|---|---|---|
| 1,107,177 | Noble | Aug. 11, 1914 |
| 2,201,087 | Hallowell | May 14, 1940 |
| 2,235,435 | Koester | Mar. 18, 1941 |
| 2,239,352 | Cherry | Apr. 22, 1941 |
| 2,245,525 | Dicely | June 10, 1941 |
| 2,727,256 | Moore | Dec. 20, 1955 |
| 2,778,265 | Brown | Jan. 22, 1957 |

FOREIGN PATENTS

| | | |
|---|---|---|
| 648,504 | Great Britain | Jan. 3, 1951 |